(12) United States Patent
Kovnat

(10) Patent No.: US 8,132,014 B2
(45) Date of Patent: Mar. 6, 2012

(54) IMAGE ARCHIVER

(75) Inventor: Larry A. Kovnat, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1527 days.

(21) Appl. No.: 11/511,991

(22) Filed: Aug. 29, 2006

(65) Prior Publication Data

US 2008/0055629 A1 Mar. 6, 2008

(51) Int. Cl.
*G06F 21/00* (2006.01)
(52) U.S. Cl. .......... 713/176; 713/165; 713/172; 396/78; 707/822
(58) Field of Classification Search .......... 713/165, 713/172, 176; 705/23
See application file for complete search history.

(56) References Cited

U.S. PATENT DOCUMENTS

| | | | | |
|---|---|---|---|---|
| 5,898,824 A | * | 4/1999 | Kato et al. | 358/404 |
| 5,900,883 A | * | 5/1999 | Crucs | 345/629 |
| 6,813,709 B1 | * | 11/2004 | Benardeau | 713/172 |
| 6,907,529 B1 | | 6/2005 | Hirose | 713/200 |
| 6,990,490 B2 | | 1/2006 | Sasaki et al. | 707/8 |
| 7,203,312 B1 | * | 4/2007 | Hatanaka et al. | 713/165 |
| 2002/0054334 A1 | * | 5/2002 | Harrison et al. | 358/1.15 |
| 2002/0181006 A1 | * | 12/2002 | Chrisop et al. | 358/1.14 |
| 2002/0194479 A1 | * | 12/2002 | Beuten et al. | 713/172 |
| 2006/0031674 A1 | | 2/2006 | Sakurai | 713/166 |
| 2007/0038518 A1 | * | 2/2007 | Yokoyama | 705/23 |

FOREIGN PATENT DOCUMENTS

CN 1381787 A 11/2002

* cited by examiner

*Primary Examiner* — Vivek Srivastava
*Assistant Examiner* — Thong Truong
(74) *Attorney, Agent, or Firm* — Alix, Yale & Ristas, LLP

(57) ABSTRACT

An archiver system for tracking the exchange of personally identifiable information in document production systems includes a document production device and a media writer. When a document processing job is initiated, a digital image of the document is prepared, the document digital image is encrypted with a session key, and the encrypted document digital image and job data associated with the document processing job are stored in a job record of a database on a storage media by the media writer.

13 Claims, 5 Drawing Sheets

IMAGE ARCHIVER

BACKGROUND

This disclosure relates generally to document production devices. More particularly, the present disclosure relates to control systems for document production devices.

Within the information security domain, accountability is a top-level goal. Accountability is achieved by tracking activity, for example in a log file. Much recent legislation such as the Health Insurance Portability and Accountability Act of 1996 (HIPAA), Sarbanes-Oxley, etc, requires organizations to track the exchange of personally identifiable information. It would be desirable to provide an automated system for tracking such information in document production systems.

SUMMARY

There is provided a method of tracking the exchange of personally identifiable information in document production systems, comprising initiating a document processing job, preparing a digital image of the document, encrypting the document digital image with a session key, and storing the encrypted document digital image in a job record of a database on a storage media. Job data associated with the document processing job is also stored in the job record.

Initiating the document processing job may also include creating a digital image of a user initiating the job with a digital camera and storing the user digital image in the job record.

Preparing the document digital image may include scanning a hard-copy document to create a digital image file of the document. Alternatively, preparing the document digital image may include converting a digital document file to a digital image file of the document.

Before the encrypted document digital image is stored on the storage media the size of the digital image file is computed. The digital image file size is compared to the available free space on the storage media and it is determined whether there is sufficient space on the recording media to store the digital image file. If there is sufficient available free space, the encrypted document digital image is stored on the storage media. If there is insufficient available free space, a media change routine is initiated.

The storage media is locked to a media writer. Accordingly, the media change routine prompts the user to unlock the media writer with a physical key. In response, the user unlocks the media writer with the physical key, inserts a blank storage media into the media writer, and locks the media writer with the physical key.

After the user inserts the blank storage media in the media writer, the media change routine creates a session key, encrypts the session key with a public key stored in the physical key, writes the encrypted session key onto the storage media and writes a database template onto the storage media.

To review the image, the storage media is inserted into a media reader and the physical key is inserted into a key portal of a computer in communication with the media reader. The session key stored on the storage media is decrypted with a private key stored in the computer and the document digital image stored on the storage media is decrypted with the decrypted session key.

To prepare the physical key, the physical key is inserted into the key portal of the computer. A public/private key pair is generated with the public key being stored on the physical key and the private key being stored in the computer. When the key is inserted into the key portal, the computer determines whether the physical key is blank. If the physical key is not blank, the computer queries the user whether or not the key should be erased. If the user responds that the key should not be erased, the computer prompts the user to remove the physical key. If the user responds that the key should be erased, the computer erases the key.

BRIEF DESCRIPTION OF THE DRAWINGS

The present disclosure may be better understood and its numerous objects and advantages will become apparent to those skilled in the art by reference to the accompanying drawings in which.

DETAILED DESCRIPTION

Figure 1:
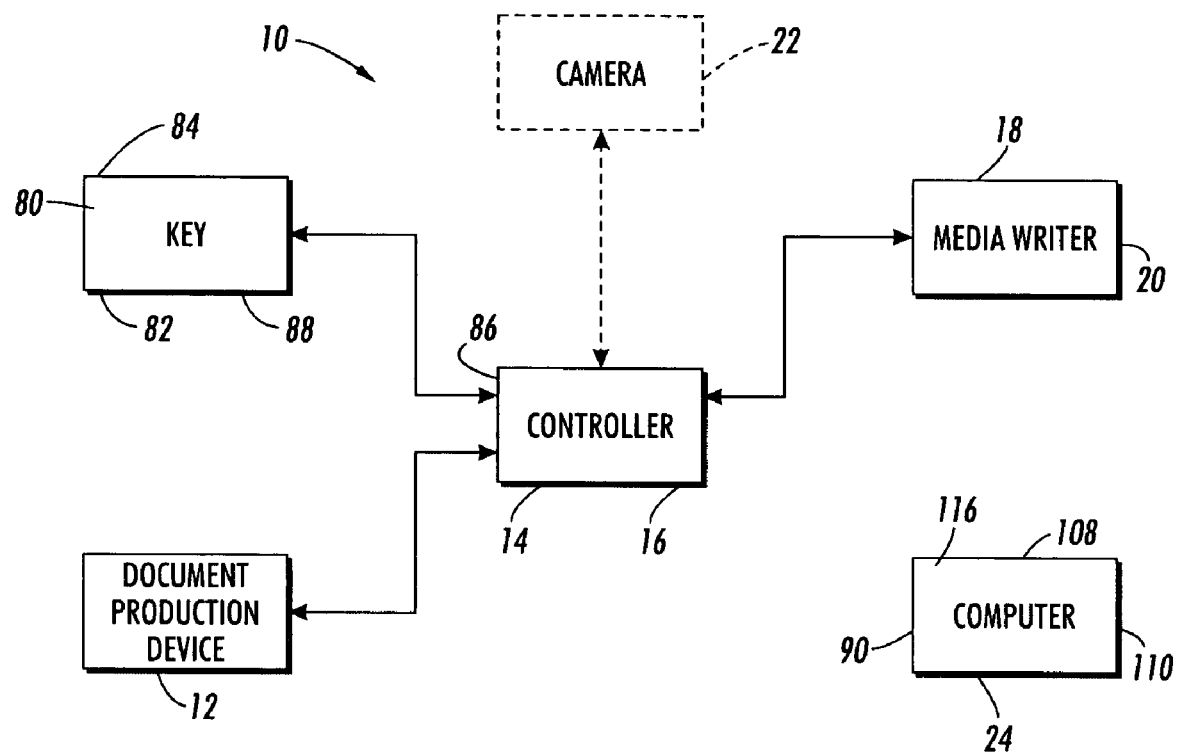
FIG. 1 is a schematic diagram of an image archiver system in accordance with the disclosure.

With reference to the drawings wherein like numerals represent like parts throughout the several figures, an archiver system in accordance with the present disclosure is generally designated by the numeral 10.

The archiver system 10 includes a document production device 12, hereby defined to include any device capable of printing, copying, scanning, faxing or reproducing a document. A controller 14 having a memory section 16 controls operation of the document production device 12. A media writer 18, for storage media 20 having sufficient capacity to store images of documents processed by the document production device 12, is in communication with the controller 14. "Processed" is hereby defined to include the acts of printing, copying, scanning, faxing or otherwise reproducing a document. In one alternative of the archiver system 10, the storage media 20 is a removable media such as a DVD that effectively provide unlimited storage capacity. In another alternative, the media writer 18 is a hard-drive with an integral read/write head. The controller 14, the media writer 18 and the document production device 12 may be a single, integral device, separate devices or any such combination of devices. The archiver system 10 may also include a digital camera 22 positioned to record the image of the operator of the document production device 12. The archiver system 10 may further include a computer 24, as explained in greater detail below.

Figure 2:
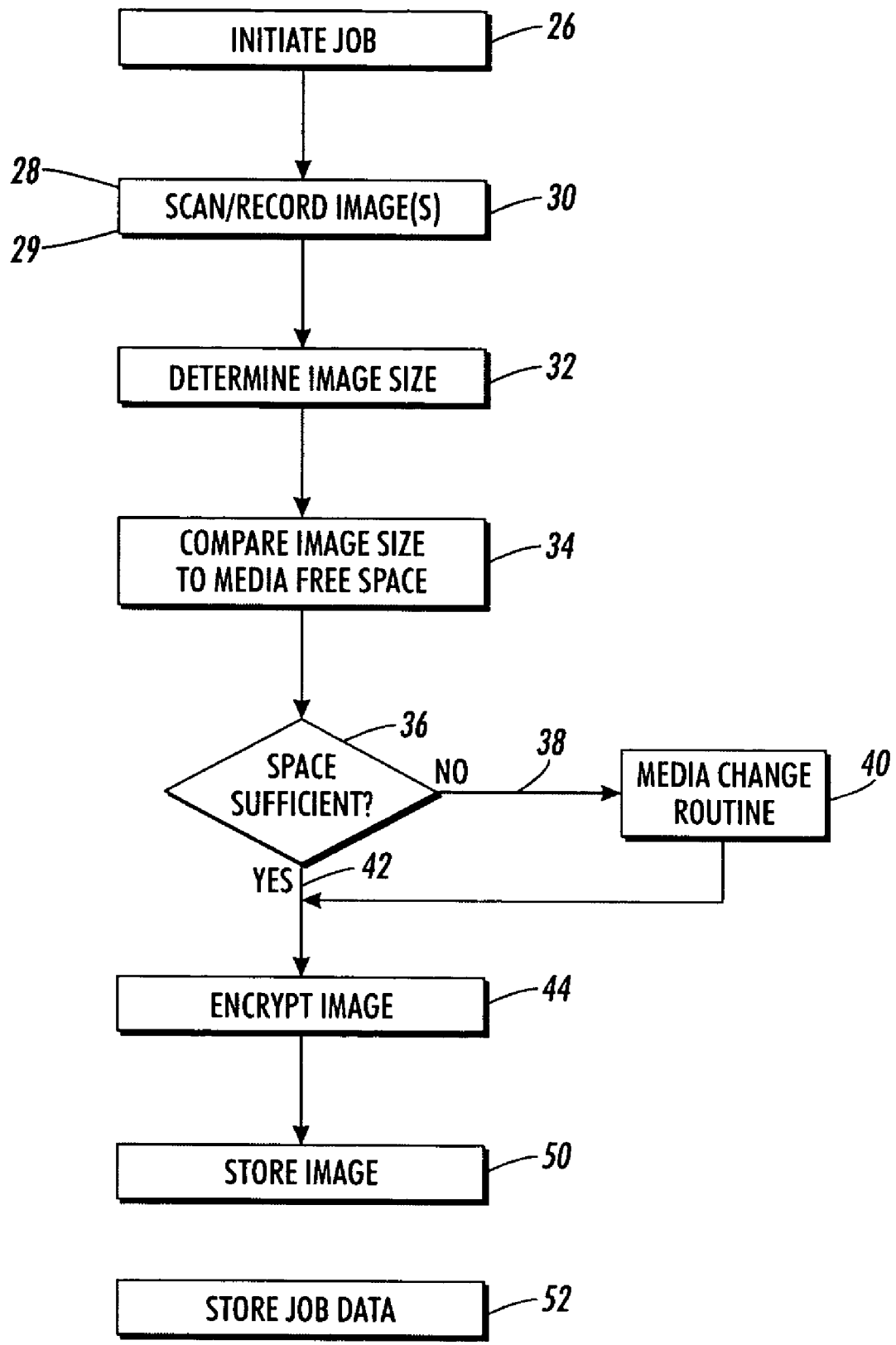
FIG. 2 is a flow diagram of an image archiver routine in accordance with the disclosure.
Figure 3:
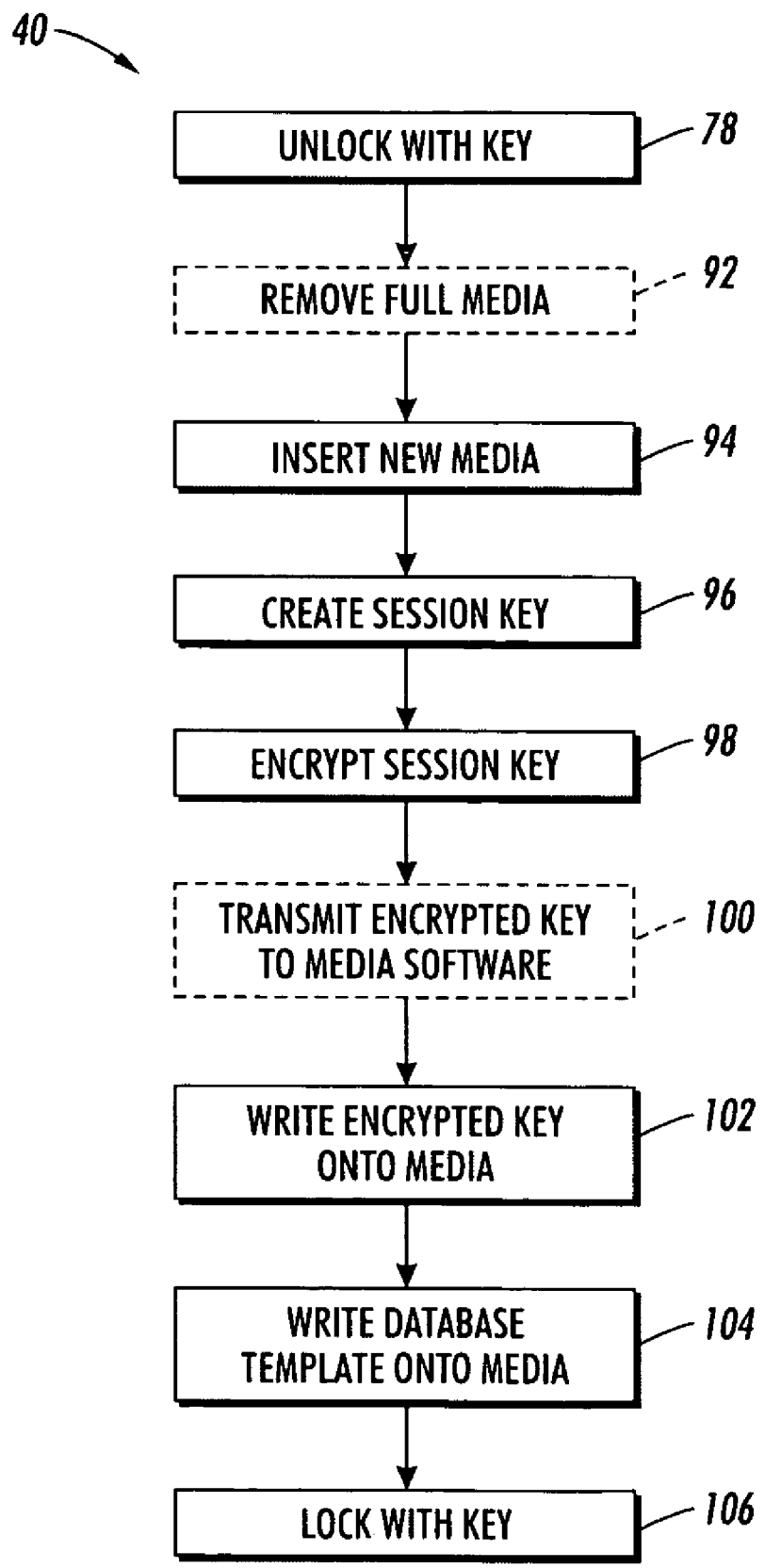
FIG. 3 is a flow diagram of a media change routine in accordance with the disclosure.
Figure 4:
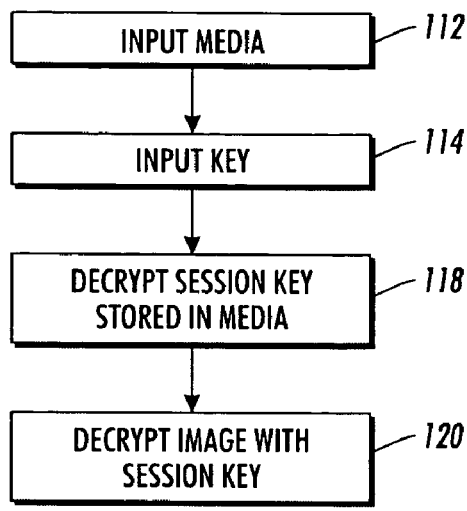
FIG. 4 is a flow diagram of an image review routine in accordance with the disclosure.
Figure 5:
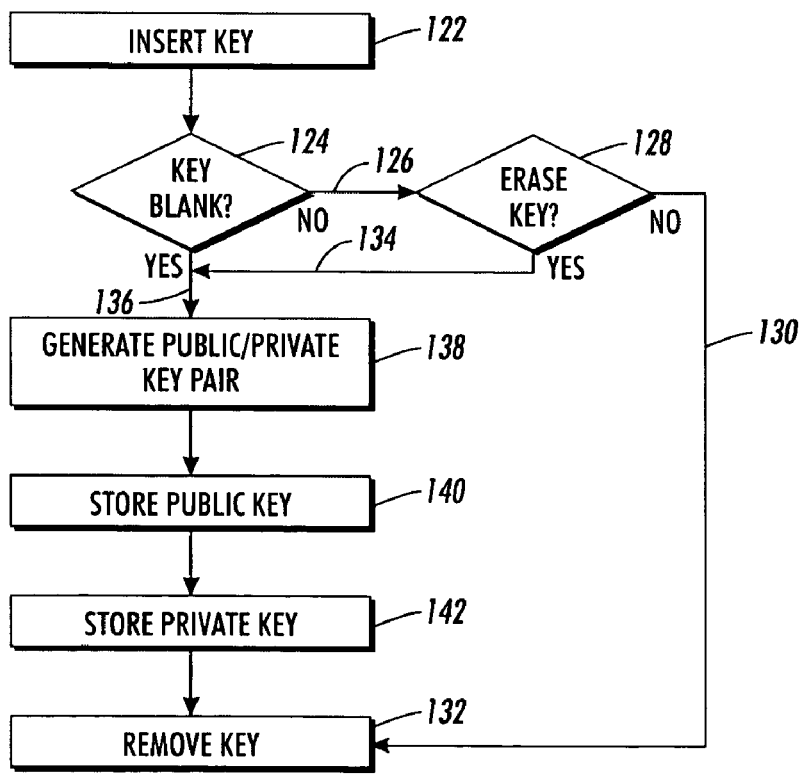
FIG. 5 is a flow diagram of a key preparation routine in accordance with the disclosure.

A job may be initiated 26 in a number of ways. If the document production device 12 is a printing device or a multi-function device, the user may initiate 26 a job by activating the document production device 12 to print a print job (FIG. 2). If the system 10 includes a digital camera 22, the controller 14 initiates the camera 22 to record the image of the user when the job is initiated 26. The archiver system 10 first prepares 28 a digital image of the document. For example, if the document production device 12 is a multi-function device, a copying device, a scanning device or a facsimile device, the user initiates 26 a job by activating the document production device 12 to copy, scan or transmit the document, thereby preparing 29 the document. In the first case, where the document is a digital file, the document may be converted 30 to a file format suitable for use with the system 10, if necessary. In the second case, where the document is a hard-copy document, all of the pages of the document are scanned to provide a digital image file of the document. The size of the digital image file is then computed 32 and compared 34 to the available free space on the storage media 20 disposed within the media writer 18 to determine 36 whether there is sufficient space on the recording media to store the digital image file. If there is insufficient space 38 on the storage media 20 to store the digital image file, the controller 14 initiates the media change routine 40. If there is sufficient space 42 on the storage media 20 to store the digital image file, the digital image file is encrypted 44 with a session key created specifically for that storage media 20 by the media change routine 40.

In addition to determining the recording media has sufficient capacity to record a new job, the controller may also provide an indication of the remaining storage capacity of the installed recording media. For example, a visual indication such as a "gas gauge" may be used to illustrate the remaining capacity. If the document production device supports email, an email alert can be sent to a designated system administrator. Finally, SNMP traps can be generated as the recording media nears completion.

Figure 6:
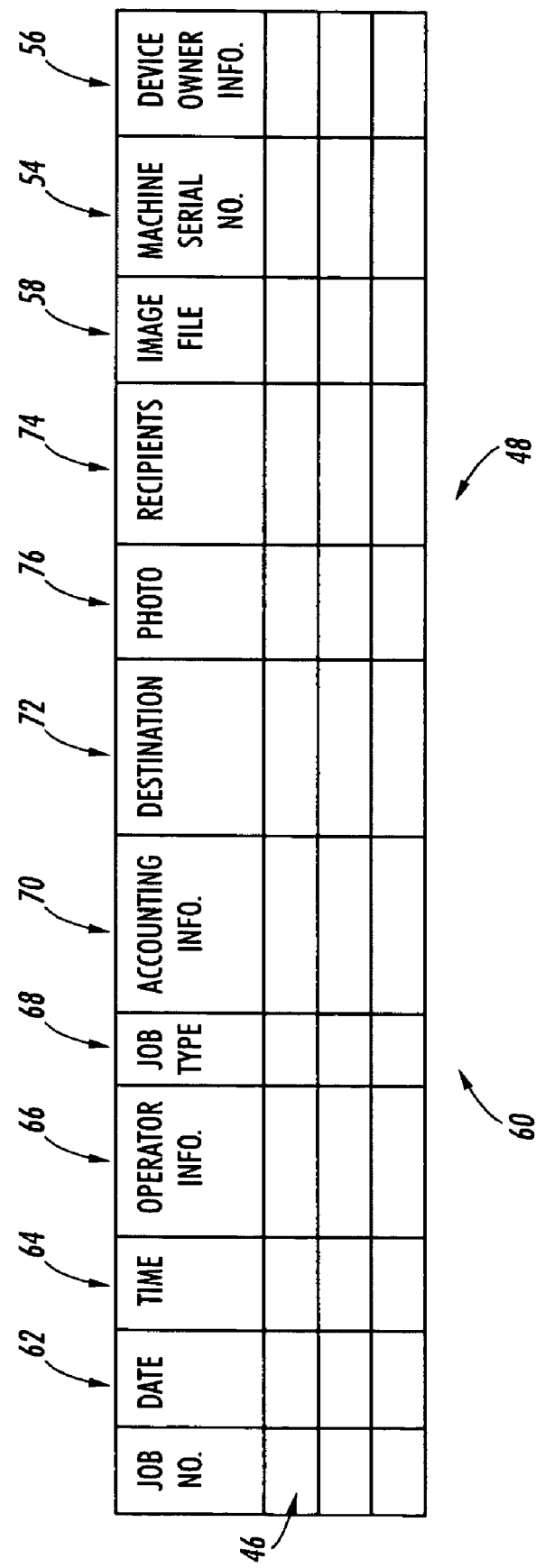
FIG. 6 is a schematic representation of a database stored in a memory section of the controller of FIG. 1.

The controller 14 creates a job record 46 in a database structure 48 written on the storage media 20, stores 50 the encrypted digital image file, and stores 52 job data in the job record. With reference to FIG. 6, the database 48 includes fields for the machine serial number 54 of the document production device 12, device owner information 56, the encrypted digital image file 58, and the job data 60. The job data fields 60 include the date 62 and time 64 of the job, the identity 66 of the user, the job type 68, accounting information 70 for the job, the destination 72 and recipients 74 of the job (for scan, fax and email jobs), and the digital photograph 76 of the user if available.

The media change routine 40 is initiated to install storage media 20 in the media writer 18. As a security measure, the storage media 20 is physically locked to or within the media writer 18, limiting access only to authorized system administrators or key operators. Accordingly, the media change routine 40 first prompts the user to unlock 78 the media writer 18 with a physical key 80. The key includes an integral memory chip 82 or an integral active processor 84, similar to a Smart Card processor. If the key 80 includes a processor 84, it will also include electrical contacts for connecting with corresponding contacts of the media writer 18 or document production device 12 to provide communication between the key processor 84 and the controller 14. The physical packaging of the key 80 is designed to provide appropriate electrical contact when seated in the lock socket 86. The memory chip 82/processor 84 on the key 80 contains a cryptographic public key 88. The private key 90 is stored in the computer 24 described below.

To unlock the storage media 20, the user inserts the key and physically turns the locking mechanism to the "unlock" position. The full storage media 20, if present, is then removed 92. A new, blank storage media 20 is then inserted 94 into the media writer 18. The controller 14 communicates with the key processor 84 or the key memory chip 82 and a symmetric session key is created 96 using a key exchange algorithm (e.g. Diffie-Hellman). The session key is then encrypted 98 with the public key 88 stored in the key 80. The session key may be created and encrypted by the key processor 84, if available, or the controller 14. If the key processor 84 is used to create 96 and encrypt 98 the session key, the encrypted session key is transmitted 100 from the key processor 84 to the controller 14. The controller 14 writes 102 the encrypted session key onto the storage media 20. The controller 14 also writes 104 the database template onto the storage media 20. The user then turns 106 the locking mechanism with the key back to "lock" position and removes key from the locking mechanism, thereby locking the storage media 20 to the media writer 18.

As described above, the images 58 stored on the storage media 20 are encrypted 44 with the session key created specifically for that storage media 20. Each storage media 20 will have a different encryption key. To recover or view the images a computer 24 having the corresponding private key 90, a key portal 108, and a media reader 110 must be used. This computer 24 can be equipped with a similar locking mechanism to that on the media writer 18. The person wishing to read the encrypted image 58 first inserts 112 the storage media 20 into the media reader 110 and then inserts 114 the physical key 80 into the key portal 108. The physical key 80 must be inserted 114 before the software 116 on the computer 24 will allow access to the stored private key 90. Requiring the physical key 80 also provides additional authentication of the user, in the sense that presumably only the authorized user would have physical possession of the key 80. In a variation of the system 10, computer 24 may require a PIN, password, or some other means of identification, in addition to possession of the physical key 80. Software 116 stored on the storage media 20 or in the computer 24 then uses the private key 90 to decrypt 118 the session key stored on the storage media 20, and then the session key is used to decrypt 120 the images 58.

The computer 24 is used to set up the physical key 80. A key 80 is inserted 122 in the portal 108 attached to the computer 24, and then the computer 24 verifies 124 that the key 80 is blank. If the computer determines that the key is not blank 126, the key preparation routine queries 128 the user whether or not the key should be erased. If the user responds that the key should not be erased 130, the key preparation routine prompts the user to remove 132 the key 80. If the user responds that the key should be erased 134, the key preparation routine erases the key, thereby creating a blank key. If the computer determines that the key is blank 136, or after a used key has been erased 134, the key preparation routine generates 138 a public/private key pair. The public key 88 is stored 140 on the physical key 80, while the private key 90 is stored 142 in the computer's cryptographic key store. Henceforth, the private key 90 can only be accessed if the physical key 80 is inserted in the attached portal 108.

The subject image archiver system 10 provides a convenient, easy-to-use, apparatus and method for archiving images 58 processed by document production devices 12. It protects the confidentiality of that data using both encryption and physical locks. Storing the session key on the storage media 20 eliminates the need for separate offline key management. Encrypting the session key with a private key 90 means that the images 58 cannot be accessed barring a brute force attack on the data itself. Each storage media 20 gets a unique session key, providing additional protection in the event that the encryption of any one storage media 20 is broken.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of tracking the exchange of personally identifiable information in document production systems comprises:
   initiating a document processing job;
   preparing a digital image of the document;
   encrypting the document digital image with a session key;
   computing a size of the digital image file;
   comparing the digital image file size to an available free space on a storage media locked to a media writer;
   determining whether there is sufficient space on the storage media to store the digital image file;
   storing the encrypted document digital image on the storage media if there is sufficient available free space; or
   initiating a media change routine if there is insufficient available free space,
      the media change routine prompting the user to unlock the media writer with a physical key wherein
         the user unlocks the media writer with the physical key,
         the user inserts a blank storage media into the media writer, and
         the user locks the media writer with the physical key,
      wherein after the user inserts the blank storage media in the media writer, the media change routine
         creates a session key,
         encrypts the session key with a public key stored in the physical key,
         writes the encrypted session key onto the storage media, and
         writes a database template onto the storage media; and
   storing job data associated with the document processing job in the job record.

2. The method of claim 1 wherein initiating the document processing job comprises activating a document production device to print a print job.

3. The method of claim 1 wherein initiating the document processing job comprises activating a document production device to copy, scan or transmit a document.

4. The method of claim 1 wherein initiating the document processing job includes
   creating a digital image of a user initiating the job with a digital camera; and
   storing the user digital image in the job record.

5. The method of claim 1 wherein preparing the document digital image includes scanning a hard-copy document to create a digital image file of the document.

6. The method of claim 1 wherein preparing the document digital image includes converting a digital document file to a digital image file of the document.

7. The method of claim 1 wherein after the session key is encrypted, the media change routine transmits the encrypted session key to a media software.

8. The method of claim 1 further comprising an image review routine comprising:
   inserting the storage media into a media reader;
   decrypting the document digital image stored on the storage media; and
   viewing the decrypted document digital image.

9. The method of claim 8 wherein the image review routine further comprises:
   inserting the physical key into a key portal of a computer in communication with the media reader;
   decrypting the session key stored on the storage media with a private key stored in the computer; and
   decrypting the document digital image stored on the storage media with the decrypted session key.

10. The method of claim 1 further comprising a physical key preparation routine comprising:
    inserting the physical key into a key portal of a computer;
    generating a public/private key pair;
    storing the public key on the physical key;
    storing the private key in the computer; and
    removing the physical key from the key portal.

11. The method of claim 10 wherein after the key is inserted into the key portal, the physical key preparation routine:
    determines whether the physical key is blank;
    queries the user whether or not the key should be erased, if the physical key is not blank; and
    prompts the user to remove the physical key if the user responds that the key should not be erased; or
    erases the key if the user responds that the key should be erased.

12. A method of tracking the exchange of personally identifiable information in document production systems comprises:
    storing an encrypted session key onto a storage media;
    storing data associated with each document processed by the document production system in a job record of a database on the storage media, the data including an encrypted digital image of each document, and job data associated with the document processing job, wherein storing data includes
       computing a size of the encrypted digital image file,
       comparing the encrypted digital image file size to an available free space on the storage media,
       determining whether there is sufficient space on the recording media to store the encrypted digital image file, and
       storing the encrypted document digital image file on the storage media if there is sufficient available free space, or
       initiating a media change routine if there is insufficient available free space;
    preparing a physical key by
       generating a public/private key pair, and
       storing the public key on the physical key; and
    reviewing the document data by
       inserting the physical key into a key portal in communication with the storage media,
       creating a session key,
       encrypting the session key with the public key stored in the physical key,
       writing the encrypted session key onto the storage media,
       decrypting the encrypted session key with the private key, and
       decrypting the encrypted document digital image with the decrypted session key.

13. The method of claim 12 further comprising storing the private key in the computer.

* * * * *